Aug. 11, 1931.  F. S. COE  1,818,693
BRACKET FOR TUNERS
Filed May 8, 1930  2 Sheets-Sheet 1
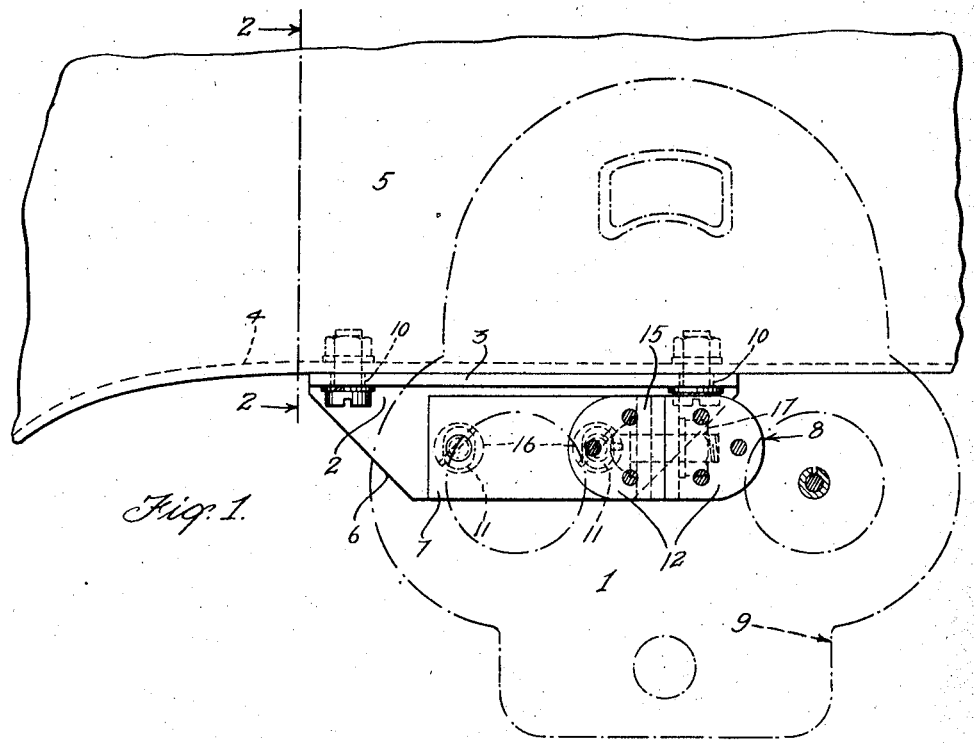
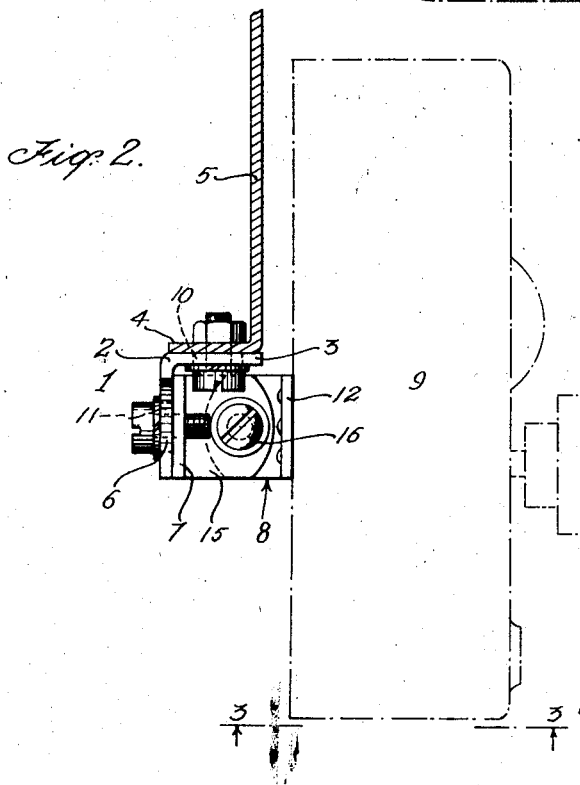
INVENTOR
FRANK S. COE.
BY
ATTORNEY Aug. 11, 1931.   F. S. COE   1,818,693
BRACKET FOR TUNERS
Filed May 8, 1930   2 Sheets-Sheet 2
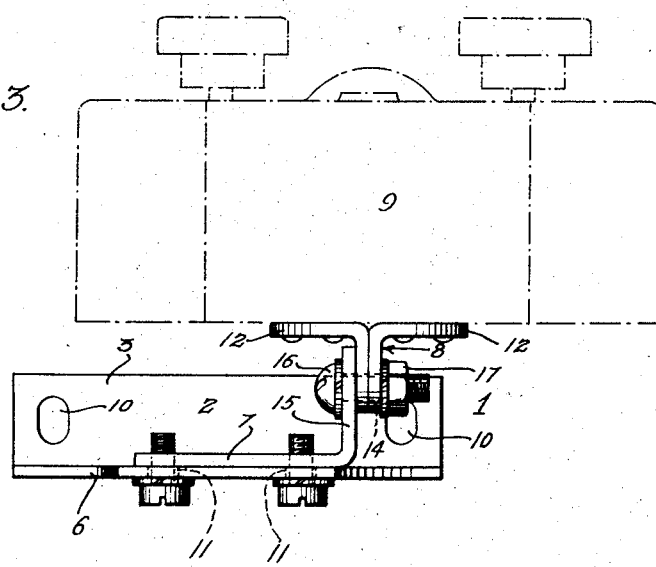
Fig. 3.
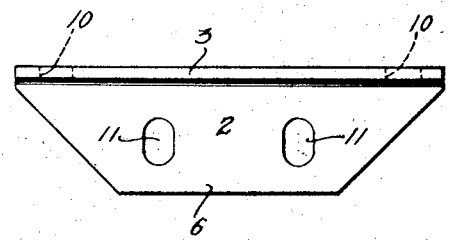
Fig. 4.
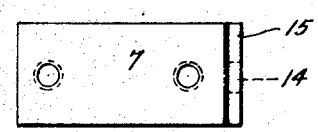
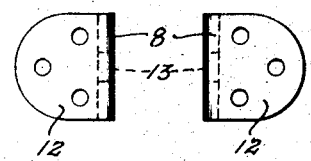
INVENTOR
FRANK S. COE.
BY
ATTORNEY Patented Aug. 11, 1931

1,818,693

UNITED STATES PATENT OFFICE

FRANK S. COE, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK

BRACKET FOR TUNERS

Application filed May 8, 1930. Serial No. 450,691.

This invention relates to a bracket for mounting the tuner of a radio receiver to the instrument panel or the like of a motor vehicle.

The object of this invention is to provide a bracket which will permit said tuner to be adjusted relatively to said panel so that said tuner may be disposed in an upright or other position no matter what the inclination of said panel may be.

Accordingly, said bracket has component elements which are movable or adjustable relatively to each other to permit the tuner to be adjusted to the desired position.

A preferred embodiment of the invention is illustrated in the accompanying drawings, wherein Fig. 1 is a front elevation of the bracket and tuner as mounted on an instrument panel; Fig. 2 is a side view on the line 2—2 of Fig. 1; Fig. 3 is a bottom view; and Fig. 4 shows the bracket disassembled and the parts in sequence positions.

The bracket 1 comprises an angled member 2 having a portion or flange 3 adapted to be attached to the flange 4 of the instrument panel 5 of a motor vehicle, and having a depending portion or flange 6 adapted to have attached thereto an intermediate member 7 to which is secured a pivotable member 8 adapted to be attached to the tuner 9.

The angled member 2 is adapted to have some slight movement with respect to the panel in a horizontal plane, about a vertical axis whereby the tuner may be turned somewhat about said axis. In the present instance this member is provided with elongated slots 10, 10 which permit this adjustment of the members.

The intermediate member 7 is adapted to be adjusted with respect to the angled member, the member 7 being capable of movement about an axis at right angles to the vertical axis of the member 2, this movement being permitted by the elongated slots 11, 11 therein, whereby the said tuner may be tilted or rotated somewhat to one side or the other about the horizontal axis.

The slotted construction of the angled member 2 permits it also to be moved bodily along a horizontal plane with respect to the panel so to provide the necessary or desirable clearance of the tuner from the panel, while due to the same slotted construction the intermediate member may also be moved bodily in a vertical plane to permit the tuner to be raised or lowered as may be desired with respect to said panel.

The pivotable member 8 comprises two angled elements 12, 12 having corresponding sides secured together and provided with an opening 13 which is adapted to register with an opening 14 in an angled portion or flange 15 of the intermediate member. A screw 16 is passed through said openings and the parts secured by the nut 17.

The pivotable connection between the intermediate and member 8 permits the tilting of the tuner toward and from the panel, and the joint is tightened when the proper position of the tuner is achieved, as are then of course all the other elements or members.

It is found convenient to first rivet the pivotable member 8 to the back face 7 of the tuner as shown in the drawings.

It will be seen that each of the members is movable relatively to each other about an axis perpendicular to the axis of movement of the others.

Having described my invention, what I claim is:

A bracket comprising an angled member, one flange of which is arranged to be attached to a supporting structure and the other flange of which is provided with spaced apertures, an intermediate angled member, one flange of which is arranged to lap the second named flange of the first named member and is provided with apertures coinciding with said first named apertures, elements passing through each of said apertures securing said members together, and a third member pivotally secured to the other flange of said intermediate member.

In testimony whereof I affix my signature.

FRANK S. COE.